(12) United States Patent
Li et al.

(10) Patent No.: US 11,631,852 B2
(45) Date of Patent: Apr. 18, 2023

(54) SECONDARY BATTERY, PREPARATION METHOD THEREOF, AND BATTERY MODULE, BATTERY PACK, AND APPARATUS ASSOCIATED THEREWITH

(71) Applicant: CONTEMPORARY AMPEREX TECHNOLOGY CO., LIMITED, Ningde (CN)

(72) Inventors: Erling Li, Ningde (CN); Meng Kang, Ningde (CN); Baida Deng, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/853,229

(22) Filed: Jun. 29, 2022

(65) Prior Publication Data

US 2022/0328831 A1    Oct. 13, 2022

Related U.S. Application Data

(63) Continuation of application No. PCT/CN2020/121264, filed on Oct. 15, 2020.

(51) Int. Cl.
*H01M 4/58* (2010.01)
*H01M 4/583* (2010.01)
(Continued)

(52) U.S. Cl.
CPC .......... *H01M 4/583* (2013.01); *H01M 4/366* (2013.01); *H01M 4/623* (2013.01); *H01M 4/625* (2013.01);
(Continued)

(58) Field of Classification Search
None
See application file for complete search history.

(56) References Cited

U.S. PATENT DOCUMENTS

2019/0305308 A1* 10/2019 Lee .................... H01M 4/133

FOREIGN PATENT DOCUMENTS

| CN | 101174685 A | 5/2008 |
|---|---|---|
| CN | 106935793 A | 7/2017 |

(Continued)

OTHER PUBLICATIONS

International Search Report of Application No. PCT/CN2020/121264 dated Mar. 30, 2021.
(Continued)

*Primary Examiner* — Wyatt P McConnell
(74) *Attorney, Agent, or Firm* — Ladas & Parry LLP

(57) ABSTRACT

A secondary battery, a preparation method thereof, and an apparatus including the secondary battery are described. Specifically, the secondary battery includes a negative-electrode plate, where the negative-electrode plate is of a multi-layer structure, and the multi-layer structure sequentially includes: a negative-electrode current collector, a primer layer, and a negative-electrode film layer; the negative-electrode film layer includes a first negative-electrode film layer and a second negative-electrode film layer, and the first negative-electrode film layer is located between the primer layer and the second negative-electrode film layer; and the first negative-electrode film layer includes a first negative-electrode active material, the first negative-electrode active material includes first artificial graphite, at least some particles in the first artificial graphite are secondary particles, and a quantity proportion A of the number of the secondary particles to a total number of particles of the first negative-electrode active material satisfies A≥50%.

16 Claims, 5 Drawing Sheets

(51) Int. Cl.
  *H01M 4/36* (2006.01)
  *H01M 4/62* (2006.01)
  *H01M 4/02* (2006.01)
(52) U.S. Cl.
  CPC ................. *H01M 2004/021* (2013.01); *H01M 2004/027* (2013.01)

(56) References Cited

FOREIGN PATENT DOCUMENTS

| CN | 108701816 A | 10/2018 |
| CN | 109390588 A | 2/2019 |
| CN | 111162275 A | 5/2020 |
| CN | 111540883 A | 8/2020 |

OTHER PUBLICATIONS

Written Opinion of Application No. PCT/CN2020/121264 dated Mar. 30, 2021.

\* cited by examiner

SECONDARY BATTERY, PREPARATION METHOD THEREOF, AND BATTERY MODULE, BATTERY PACK, AND APPARATUS ASSOCIATED THEREWITH

CROSS REFERENCE TO RELATED APPLICATION

This application is a continuation of International Patent Application No. PCT/CN2020/121264, filed on Oct. 15, 2020, which is incorporated herein by reference in its entirety.

TECHNICAL FIELD

This application relates to the field of electrochemical technologies, and more specifically, to a secondary battery, a preparation method thereof, and a battery module, battery pack, and apparatus associated therewith.

BACKGROUND

As a new type of high-voltage and high-energy-density rechargeable batteries, secondary batteries have outstanding characteristics such as light weight, high energy density, zero pollution, zero memory effect, and long service life, and are therefore widely applied to new energy industry.

With the development of new energy industry, higher use requirements are imposed on the secondary batteries. However, an increased energy density of the secondary batteries often has an adverse effect on kinetic performance and service life of the batteries. Therefore, the key challenge in battery design is how to take other electrochemical properties into account under the premise of a relatively high energy density.

In view of this, it is necessary to provide a secondary battery capable of resolving the foregoing problems.

SUMMARY

In view of the problems described in the background, an objective of this application is to provide a secondary battery, a preparation method thereof, and a battery module, battery pack, and apparatus associated therewith, so that the battery has both good fast charging performance and cycling performance under the premise of a relatively high energy density.

To achieve the foregoing objective, a first aspect of this application provides a secondary battery, including a negative-electrode plate, where the negative-electrode plate is of a multi-layer structure, and the multi-layer structure sequentially includes: a negative-electrode current collector, a primer layer, and a negative-electrode film layer; the negative-electrode film layer includes a first negative-electrode film layer and a second negative-electrode film layer, and the first negative-electrode film layer is located between the primer layer and the second negative-electrode film layer; and the first negative-electrode film layer includes a first negative-electrode active material, the first negative-electrode active material includes first artificial graphite, at least some particles in the first artificial graphite are secondary particles, and a quantity proportion A of the number of the secondary particles to a total number of particles of the first negative-electrode active material satisfies A≥50%.

The film layer of the negative-electrode plate of the secondary battery in this application includes a structure of at least two layers. When the first negative-electrode active material includes the first artificial graphite with a specific amount and morphology, and the primer layer is also provided on the current collector, the secondary battery can be made to have both good fast charging performance and longer cycle life under the premise of a relatively high energy density. The battery module, the battery pack, and the apparatus in this application all include the secondary battery provided in this application, and therefore have at least the same advantages as the secondary battery.

In any embodiment of this application, A≥60%; and optionally, 70%≤A≤100%. A within a given range can further improve the fast charging performance of the battery.

In any embodiment of this application, the primer layer includes a binder and a conductive agent.

In any embodiment of this application, a mass proportion of the binder in the primer layer is less than or equal to 50%; and optionally, 30%-45%. A percentage of the binder within a given range can further improve the cycling performance of the battery.

In any embodiment of this application, a mass proportion of the conductive agent in the primer layer is greater than or equal to 50%; and optionally, 55%-70%. A percentage of the conductive agent within a given range can further improve the fast charging performance of the battery.

In any embodiment of this application, a thickness of the primer layer is greater than or equal to 1 μm; and optionally, the thickness of the primer layer is 1.5-5 μm. A thickness of the primer layer within such a range helps to achieve a balance between the fast charging performance and the cycling performance of the battery.

In any embodiment of this application, the binder in the primer layer may include one or more of styrene butadiene rubber (SBR), polyvinylidene fluoride (PVDF), polyvinylidene fluoride copolymer (such as polyvinylidene fluoride-hexafluoropropylene), polystyrene, polyacrylic acid, polytetrafluoroethylene, polyacrylonitrile, polyimide, polyurethane, polyvinyl alcohol, polyvinyl butyral (PVB), polyacrylate, acrylic acid-acrylonitrile copolymer, ethylene-vinyl acetate copolymer (EVA), acrylate-acrylonitrile copolymer, and modified compounds thereof.

In any embodiment of this application, the conductive agent may include a conductive carbon material. For example, the conductive agent may include one or more of acetylene black, conductive carbon black, Ketjen black, carbon nanotubes, carbon fibers, or graphene.

In any embodiment of this application, the first negative-electrode active material may further include natural graphite; and optionally, a mass proportion of the natural graphite in the first negative-electrode active material is less than or equal to 50%. This helps to improve power performance and fast charging performance of the battery, and helps to flexibly adjust various performance of the battery to meet usage requirements of different occasions.

In any embodiment of this application, a volume-based median particle size $D_v50$ of the first negative-electrode active material satisfies $D_v50 \geq 15$ μm, and optionally, 17 μm ≤ $D_v50$ ≤ 23 μm. This helps to further improve the energy density and cycling performance of the battery.

In any embodiment of this application, particle size uniformity of the first negative-electrode active material is greater than or equal to 0.20, and optionally, 0.20-0.60, or 0.25-0.45. This helps to further improve the fast charging performance and cycling performance of the battery.

In any embodiment of this application, a specific surface area SSA of the first negative-electrode active material satisfies SSA ≤ 1.6 m²/g, and optionally, 0.4 m²/g ≤ SSA ≤ 1.5 m²/g. This helps to further improve the fast charging performance and cycling performance of the battery.

In any embodiment of this application, a particle size distribution of the first negative-electrode active material is $0.6 \leq (D_v90-D_v10)/D_v50 \leq 3.5$, and optionally, $0.7 \leq (D_v90-D_v10)/D_v50 \leq 2.8$. This helps to further improve the fast charging performance of the battery.

In any embodiment of this application, a powder OI value of the first negative-electrode active material is less than or equal to 8.5, and optionally, 1.8-7.5. This helps to further improve the fast charging performance of the battery and reduce swelling of the battery.

In any embodiment of this application, a gram capacity of the first negative-electrode active material is greater than or equal to 352 mAh/g, and optionally, 353-370 mAh/g. This helps to further improve the energy density of the battery.

In any embodiment of this application, a second negative-electrode active material includes second artificial graphite; and optionally, a mass proportion of the second artificial graphite in the second negative-electrode active material is greater than or equal to 80%, for example, greater than or equal to 90%. This helps to improve the fast charging performance and cycling performance of the battery, and helps to flexibly adjust various performance of the battery to meet usage requirements of different occasions.

In any embodiment of this application, at least some particles in the second artificial graphite are secondary particles. Optionally, a quantity proportion B of the number of the secondary particles to a total number of particles of the second negative-electrode active material satisfies B≥60%; and optionally, 80%≤B≤100%. This may help to further improve the fast charging performance of the battery.

In any embodiment of this application, a volume-based median particle size $D_v50$ of the second negative-electrode active material satisfies $7\ \mu m \leq D_v50 \leq 15\ \mu m$, and optionally, $9\ \mu m \leq D_v50 \leq 13.5\ \mu m$. This helps to further improve the fast charging and cycling performance of the battery.

In any embodiment of this application, particle size uniformity of the second negative-electrode active material is 0.20-0.50, and optionally, 0.25-0.4. This helps to further improve the fast charging and cycling performance of the battery.

In any embodiment of this application, a specific surface area SSA of the second negative-electrode active material satisfies SSA≤1.6 m²/g, and optionally, 0.4 m²/g≤SSA≤1.55 m²/g. This helps to further improve the fast charging and cycling performance of the battery.

In any embodiment of this application, a particle size distribution of the second negative-electrode active material is $0.5 \leq (D_v90-D_v10)/D_v50 \leq 3.0$, and optionally, $0.8 \leq (D_v90-D_v10)/D_v50 \leq 2.8$. This helps to further improve the fast charging and cycling performance of the battery.

In any embodiment of this application, a powder OI value of the second negative-electrode active material is less than or equal to 6, and optionally, 1.5-5.5. This helps to further improve the swelling, fast charging and cycling performance of the battery.

In any embodiment of this application, a gram capacity of the second negative-electrode active material is greater than or equal to 345 mAh/g, and optionally, 348-360 mAh/g. This helps to further improve electrical performance of the battery.

In any embodiment of this application, a ratio of the particle size uniformity of the second negative-electrode active material to the particle size uniformity of the first negative-electrode active material is 0.6-2, and optionally, 0.8-1.25. This helps to further improve the fast charging and cycling performance of the battery.

In any embodiment of this application, a surface density of the negative-electrode film layer is greater than or equal to 0.117 mg/mm², and optionally, 0.119-0.130 mg/mm². This helps to further improve the energy density of the battery.

In any embodiment of this application, a press density of the negative-electrode film layer is greater than or equal to 1.4-1.75 g/cm³, and optionally, 1.65-1.75 g/cm³. This helps to further improve the fast charging performance and energy density of the battery.

In any embodiment of this application, a thickness ratio of the second negative-electrode film layer to the first negative-electrode film layer is 1:1-3:2. This helps to further improve the fast charging performance of the battery.

In any embodiment of this application, a ratio of the OI value of the second negative-electrode active material to the first negative-electrode active material is less than or equal to 1.2. This helps to further improve the swelling, fast charging and cycling performance of the battery.

A second aspect of this application provides a preparation method of a secondary battery, at least including the following steps:

(1) providing a primer layer on at least one side of a negative-electrode current collector;

(2) providing a first negative-electrode film layer on the primer layer; and (3) providing a second negative-electrode film layer on the first negative-electrode film layer.

The secondary battery includes a negative-electrode plate, the negative-electrode plate is of a multi-layer structure, and the multi-layer structure sequentially includes: a negative-electrode current collector, a primer layer, and a negative-electrode film layer; the negative-electrode film layer includes a first negative-electrode film layer and a second negative-electrode film layer, and the first negative-electrode film layer is located between the primer layer and the second negative-electrode film layer; and the first negative-electrode film layer includes a first negative-electrode active material, the first negative-electrode active material includes first artificial graphite, at least some particles in the first artificial graphite are secondary particles, and a quantity proportion A of the number of the secondary particles to a total number of particles of the first negative-electrode active material satisfies A≥50%.

A third aspect of this application provides a battery module, including the secondary battery according to the first aspect of this application or the secondary battery prepared by the method according to the second aspect of this application.

A fourth aspect of this application provides a battery pack, including the battery module according to the third aspect of this application.

A fifth aspect of this application provides an apparatus, including at least one of the secondary battery according to the first aspect of this application, the secondary battery prepared by the method according to the second aspect of this application, the battery module according to the third aspect of this application, or the battery pack according to the fourth aspect of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
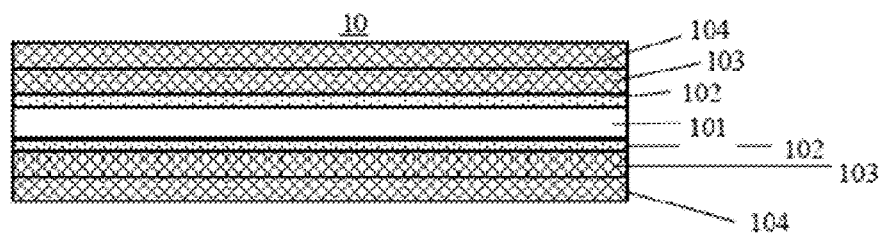
FIG. 1 is a schematic diagram of an embodiment of a negative-electrode plate of a secondary battery in this application.

In the accompanying drawings, the parts are not drawn to scale. Reference signs are as follows: 1. battery pack; 2. upper box body; 3. lower box body; 4. battery module; 5. secondary battery; 51. housing; 52. electrode assembly; 53. cover plate; 10. negative-electrode plate; 101. negative-electrode current collector; 102. primer layer; 103. first negative-electrode film layer; and 104. second negative-electrode film layer.

DETAILED DESCRIPTION

To make this application objectives, technical solutions, and beneficial technical effects of this application clearer, the following further describes this application in detail with reference to specific embodiments. It should be understood that the embodiments described in this specification are merely intended to interpret this application, but not to limit this application.

For simplicity, only some numerical ranges are explicitly disclosed in this specification. However, any lower limit may be combined with any upper limit to form an unspecified range, any lower limit may be combined with another lower limit to form an unspecified range, and similarly, any upper limit may be combined with any other upper limit to form an unspecified range. In addition, although not explicitly stated, each point or a single numerical value between end points of a range is included in the range. Therefore, each point or individual value may itself be a lower limit or upper limit and be combined with any other point or single numerical value or another lower limit or upper limit to form an unspecified range.

In the descriptions of this specification, it should be noted that "more than" or "less than" is inclusive of the present number and that "more" in "one or more" means two or more than two, unless otherwise specified.

In the descriptions of this specification, unless otherwise stated, the term "or" is inclusive. For example, a phrase "A or B" means "A, B, or both A and B". More specifically, any of the following conditions satisfies the condition "A or B": A is true (or present) and B is false (or not present); A is false (or not present) and B is true (or present); or both A and B are true (or present).

Unless otherwise specified, terms used in this application have well-known meanings generally understood by persons skilled in the art. Unless otherwise specified, numerical values of parameters mentioned in this application may be measured by using various measurement methods commonly used in the art (for example, testing may be performed by using a method provided in the embodiments of this application).

The foregoing summary of this application is not intended to describe each disclosed embodiment or each implementation of this application. The following description illustrates exemplary embodiments in detail by using examples. Throughout this application, guidance is provided by using a series of embodiments and the embodiments may be used in various combinations. In the examples, enumeration is only representative but should not be interpreted as exhaustive.

Secondary Battery

A secondary battery is alternatively a rechargeable battery or a storage battery, and is a battery that can be charged after being discharged to activate active materials for continuous use.

Usually, the secondary battery includes a positive-electrode plate, a negative-electrode plate, a separator, and an electrolyte. During charging/discharging of the battery, active ions (such as lithium ions) are intercalated and deintercalated back and forth between the positive-electrode plate and the negative-electrode plate. The separator is provided between the positive-electrode plate and the negative-electrode plate, mainly plays a role of preventing short circuits between the negative and positive electrodes, and may allow ions to pass through. The electrolyte is between the positive-electrode plate and the negative-electrode plate, and mainly plays a role of conducting ions.

Negative-Electrode Plate

A secondary battery includes a negative-electrode plate, and the negative-electrode plate generally includes a negative-electrode current collector and a negative-electrode film layer.

Generally, to increase an energy density of the battery, a thickness of the negative-electrode film layer is usually increased. However, the increase in the thickness causes impact on both fast charging performance and cycling performance of the battery. Therefore, how to make the battery have both fast charging performance and cycling performance under the premise of a relatively high energy density is still a huge technical challenge.

The inventors have found through a large quantity of experiments that the technical objective of this application can be achieved by adjusting a structure of the negative-electrode plate. Specifically, the negative-electrode plate of the secondary battery in this application is of a multi-layer structure, and the multi-layer structure sequentially includes: a negative-electrode current collector, a primer layer, and a negative-electrode film layer; the negative-electrode film layer includes a first negative-electrode film layer and a second negative-electrode film layer, and the first negative-electrode film layer is located between the primer layer and the second negative-electrode film layer; and the first negative-electrode film layer includes a first negative-electrode active material, the first negative-electrode active material includes first artificial graphite, at least some particles in the first artificial graphite are secondary particles, and a quantity proportion A of the number of the secondary particles to a total number of particles of the first negative-electrode active material satisfies A≥50%. The negative-electrode plate satisfying the foregoing design condition enables the secondary battery in this application to have both good fast charging performance and cycling performance under the premise of a relatively high energy density.

The inventors have found through research that when the negative-electrode plate includes at least two film layers and a first negative-electrode film layer includes artificial graphite with a secondary particle morphology, the energy density and fast charging performance of the battery can be significantly improved; however, at the same time, the inventors have found that when a quantity proportion of the secondary particles in the first negative-electrode active material is within a range specified in this application, although the fast charging performance of the battery can be effectively improved, the cycling performance will be affected to some extent.

It is well known in the art that there are many factors that affect the cycling performance of the battery, for example, a design of the-electrode plate structure, choice of an active material, a ratio of different components in an active material layer, choice of an electrolyte solution, and choice of a separator, and adjustment of each parameter may also affect both the cycling performance and other performance of the battery, such as the fast charging performance and the energy density.

Among the foregoing many influencing factors, the inventors have surprisingly found that when the negative-electrode plate includes at least two film layers and a quantity proportion of the first artificial graphite with a secondary particle morphology in the first negative-electrode film layer is within a range specified in this application, the cycling performance of the battery can be significantly improved if a primer layer is also provided between the current collector and the first negative-electrode film layer. Regardless of any theory, the inventors have found that when a primer layer is provided on a surface of the current collector, the primer layer can bridge the current collector and an angular structure of the artificial graphite with a secondary particle morphology in the first negative-electrode film layer, which significantly improves charge transfer ability between the first negative-electrode active material and the negative-electrode current collector, thereby effectively improving the cycling performance of the battery.

In the secondary battery in this application, the primer layer can be provided on one side of the negative-electrode current collector, or may be provided on both sides of the negative-electrode current collector. Correspondingly, the negative-electrode film layer may also be provided on one side or two sides of the negative-electrode current collector.

In the secondary battery in this application, the primer layer includes a conductive agent and a binder.

FIG. 1 is a schematic diagram of an embodiment of a negative-electrode plate 10 in this application. The negative-electrode plate 10 includes a negative-electrode current collector 101, a primer layer 102 respectively provided on both sides of the negative-electrode current collector, a first negative-electrode film layer 103, and a second negative-electrode film layer 104.

Figure 2:
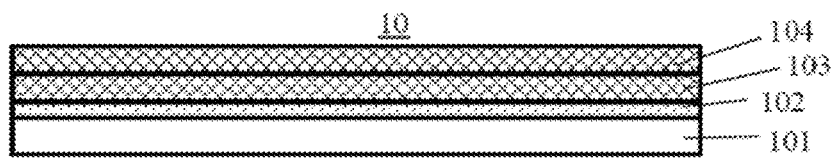
FIG. 2 is a schematic diagram of another embodiment of a negative-electrode plate of a secondary battery in this application.

FIG. 2 is a schematic diagram of another embodiment of a negative-electrode plate 10 in this application. The negative-electrode plate 10 includes a negative-electrode current collector 101, a primer layer 102 provided on one side of the negative-electrode current collector, a first negative-electrode film layer 103, and a second negative-electrode film layer 104.

The inventors have found through in-depth research that when the negative-electrode plate in this application satisfies the foregoing design conditions and optionally satisfies one or more of the following parameters, performance of the secondary battery can be further improved.

In some embodiments, a mass proportion of the conductive agent in the primer layer is greater than or equal to 50%, and for example, may be 50%-75%, 55%-70%, 60%-70%, 58%-68%, or 65%-72%. A percentage of the conductive agent within a given range can further improve the fast charging performance and cycling performance of the battery.

In some embodiments, a mass proportion of the binder in the primer layer is less than or equal to 50%, and for example, may be 25%-50%, 30%-45%, 30%-45%, 30%-40%, 32%-42%, or 28%-35%.

In some embodiments, the conductive agent may include a conductive carbon material. For example, the conductive agent may include one or more of acetylene black, conductive carbon black, Ketjen black, carbon nanotubes, carbon fibers, or graphene.

In some embodiments, the binder may include one or more of styrene butadiene rubber (SBR), polyvinylidene fluoride (PVDF), a copolymer of vinylidene fluoride (such as vinylidene fluoride-hexafluoropropylene copolymer), polystyrene, polyacrylic acid, polytetrafluoroethylene, polyacrylonitrile, polyimide, polyurethane, polyvinyl alcohol, polyvinyl butyral (PVB), polyacrylate, acrylic acid-acrylonitrile copolymer, ethylene-vinyl acetate copolymer (EVA), acrylate-acrylonitrile copolymer, and modified compounds thereof.

In some embodiments, the primer layer may also include other conventional adjuvant or additive such as a thickener. Optionally, the thickener may be sodium carboxymethyl cellulose (CMC-Na).

In some embodiments, a thickness H of the primer layer (single-side coating) satisfies H≥1 μm, for example, 1.5 μm≤H≤5 μm, 1.5 μm≤H≤4 μm, or 2.5≤H≤4.5.

In some embodiments, a quantity proportion A of the secondary particles in the first negative-electrode active material satisfies A≥60%, for example, 60%≤A≤100%, 70%≤A≤98%, 75%≤A≤96%, 80%≤A≤95%, or 85%≤A≤100%. A within a given range can further improve the fast charging performance of the battery.

In some embodiments, a volume-based median particle size $D_v50$ of the first negative-electrode active material satisfies $D_v50 \geq 14$ μm. For example, $D_v50$ may be in a range as follows: 15 μm≤$D_v50$≤25 μm, 16 μm≤$D_v50$≤25 μm, 17 μm≤$D_v50$≤25 μm, 17 μm≤$D_v50$≤24 μm, 17 μm≤$D_v50$≤23 μm, or 18.3 μm≤$D_v50$≤23 μm. When the first negative-electrode active material includes the first artificial graphite with a specific amount and morphology, and $D_v50$ of the first negative-electrode active material is controlled to be within a given range, both a lithium intercalation capacity and a press density of the first negative-electrode film layer may be maintained at a relatively high level, further improving the energy density of the battery. In addition, the first negative-electrode film layer can effectively share a pressure on the second negative-electrode film layer, so that the second negative-electrode film layer maintains a better pore structure, reducing resistance to active ion transfer, and further improving the fast charging performance of the battery.

In some embodiments, particle size uniformity (U for short) of the first negative-electrode active material satisfies 0.20≤U≤0.60. For example, U may be in a range as follows: 0.25≤U≤0.60, 0.25≤U≤0.55, 0.25≤U≤0.45, 0.25≤U≤0.50, $0.30 \leq U \leq 0.50$, $0.30 \leq U \leq 0.40$, or $0.28 \leq U \leq 0.35$. When the first negative-electrode active material includes the first artificial graphite with a specific amount and morphology, and the particle size uniformity is controlled to be within a given range, active ion transport paths in the first negative-electrode film layer are optimally matched, effectively reducing liquid phase conduction impedance of the active ions, so that active ions in each region may quickly complete the liquid phase conduction and be intercalated into the negative-electrode active material, further improving the fast charging performance of the battery.

In some embodiments, a particle size distribution of the first negative-electrode active material $(D_v90-D_v10)/D_v50$ satisfies $0.6 \leq (D_v90-D_v10)/D_v50 \leq 3.5$, for example, $1.0 \leq (D_v90-D_v10)/D_v50 \leq 3.0$, $0.8 \leq (D_v90-D_v10)/D_v50 \leq 2.5$, $1.0 \leq (D_v90-D_v10)/D_v50 \leq 2.3$, $1.1 \leq (D_v90-D_v10)/D_v50 \leq 2.3$, $1.1 \leq (D_v90-D_v10)/D_v50 \leq 1.9$, $0.7 \leq (D_v90-D_v10)/D_v50 \leq 1.6$, or $0.9 \leq (D_v90-D_v10)/D_v50 \leq 2.0$. When the first negative-electrode active material includes the first artificial graphite with a specific amount and morphology, and the particle size distribution is controlled to be within a given range, the active material can be uniformly dispersed in a slurry during battery preparation, and problems such as leakage and uneven coating of the negative-electrode film layer during coating can be effectively prevented, which can make the negative-electrode plate have relatively high ion and electron transport performance, and polarization of the battery be alleviated, thereby further improving the fast charging performance and cycling performance of the battery.

In some embodiments, a specific surface area SSA of the first negative-electrode active material satisfies $SSA \leq 1.6$ $m^2/g$. For example, the SSA may be in a range as follows: $0.4\ m^2/g \leq SSA \leq 1.6\ m^2/g$, $0.5\ m^2/g \leq SSA \leq 1.5\ m^2/g$, $0.6\ m^2/g \leq SSA \leq 1.5\ m^2/g$, or $0.7\ m^2/g \leq SSA \leq 1.3\ m^2/g$. When the first negative-electrode active material includes the first artificial graphite with a specific amount and morphology, and the SSA of the first negative-electrode active material is controlled to be within a given range, a charge exchange impedance can be reduced, and the negative-electrode film layer can obtain more developed pores, reducing liquid phase conduction impedance of active ions and consumption of the electrolyte, and thereby further improving the cycling performance of the battery.

In some embodiments, a gram capacity C of the first negative-electrode active material satisfies $C \geq 352$ mAh/g. For example, the C may be in a range as follows: $353$ mAh/g $\leq C \leq 370$ mAh/g, $354$ mAh/g $\leq C \leq 370$ mAh/g, $355$ mAh/g $\leq C \leq 365$ mAh/g, $355$ mAh/g $\leq C \leq 364$ mAh/g, or the like. When the first negative-electrode active material includes the first artificial graphite with a specific amount and morphology, and the gram capacity C of the first negative-electrode active material is controlled to be within a given range, the negative-electrode active material can have both a relatively high lithium intercalation capacity and relatively good structural stability, which can further improve the energy density and cycling performance of the battery.

In some embodiments, an OI of the first negative-electrode active material satisfies $OI \leq 8.5$. For example, the OI may be in a range as follows: $1.8 \leq OI \leq 7.5$, $1.9 \leq OI \leq 6.5$, $2.0 \leq OI \leq 5.5$, $2.2 \leq OI \leq 3.8$, or the like. When the first negative-electrode active material includes the first artificial graphite with a specific amount and morphology, and the OI of the first negative-electrode active material is controlled to be within a given range, the active material has better isotropy, which is conducive to rapid intercalation and deintercalation of active ions, further improving the fast charging performance of the battery. Furthermore, a relatively high isotropy can disperse Z-axis expansion in intercalation of the active ions, thus further improving the cycling performance of the battery.

In some embodiments, the second negative-electrode active material includes second artificial graphite.

In some embodiments, a mass proportion of the second artificial graphite in the second negative-electrode active material is greater than or equal to 80%, and for example, may be 80%-100%, 90%-100%, or 95%-100%.

In some embodiments, the second negative-electrode active material includes second artificial graphite with a second particle morphology.

In some embodiments, a quantity proportion B of the second artificial graphite with the secondary particle morphology in the second negative-electrode active material satisfies $B \geq 60\%$. For example, the B may be $60\% \leq B \leq 100\%$, $65\% \leq B \leq 98\%$, $70\% \leq B \leq 100\%$, $70\% \leq B \leq 95\%$, $75\% \leq B \leq 95\%$, $80\% \leq B \leq 100\%$, or $85\% \leq B \leq 95\%$. When the percentage B of the secondary particles in the second negative-electrode active material is controlled to be within a given range, expansion of the active material during cycling can be significantly reduced, thereby further improving the cycling performance of the battery. In particular, when the negative-electrode active materials in both upper and lower layers have artificial graphite with a specific amount of secondary particles, the active material particles in the upper and lower layers are more closely accumulated and connected, and a contact area of the active material particles at an interface of the first negative-electrode film layer and second negative-electrode film layer can also be increased, forming three-dimensional, orderly and high-speed channels for entry or exit of active ions and improving electron conductivity and shortening migration paths of active ions, thereby further improving the fast charging performance of the battery.

In some embodiments, a volume-based median particle size $D_v50$ of the second negative-electrode active material satisfies $D_v50 \leq 18$ μm. For example, $D_v50$ may be in a range as follows: $7\ \mu m \leq D_v50 \leq 18\ \mu m$, $7\ \mu m \leq D_v50 \leq 15\ \mu m$, $8\ \mu m \leq D_v50 \leq 17\ \mu m$, $9\ \mu m \leq D_v50 \leq 17\ \mu m$, $10\ \mu m \leq D_v50 \leq 15\ \mu m$, $9\ \mu m \leq D_v50 \leq 13.5\ \mu m$, $10.5\ \mu m \leq D_v50 \leq 14\ \mu m$, or $11.5\ \mu m \leq D_v50 \leq 13.5\ \mu m$. When the $D_v50$ of the second negative-electrode active material is controlled to be within a given range, pore structures in the first negative-electrode film layer and the second negative-electrode film layer are optimally maintained, and active ion transport paths are optimally matched, effectively reducing liquid phase conduction impedance of the active ions, and further improving the fast charging performance of the battery. In addition, the active ions in the upper and lower layers slip against each other and are bridged to each other, which significantly improves the press density of the-electrode plate, thereby further improving the energy density of the battery.

In some embodiments, the first negative-electrode active material or the second negative-electrode active material may also include another negative-electrode active material. The another negative-electrode active material may include one or more of natural graphite, soft carbon, hard carbon, a silicon-based material, and a tin-based or a titanium-based material. The silicon-based material may be selected from one or more of elemental silicon, silicon-oxygen compound, silicon-carbon composite, and silicon alloy. The tin-based material may be selected from one or more of elemental tin, tin-oxygen compound, and tin alloys. Preparation methods of these materials are well known, and can be available commercially. A person skilled in the art may perform proper selection based on an actual use environment.

In some embodiments, the first negative-electrode active material may further include artificial graphite.

In some embodiments, when the first negative-electrode active material further includes artificial graphite, a mass proportion of the natural graphite in the first negative-electrode active material is less than or equal to 40%, and for example, may be 10%-40%, 10%-30, or 10%-20%.

In some embodiments, the second negative-electrode active material may further include a silicon-based material.

In some embodiments, when the second negative-electrode active material further includes a silicon-based material, a mass proportion of the silicon-based material in the second negative-electrode active material is less than or equal to 10%, and for example, may be 2%-6%.

In the secondary battery in this application, the negative-electrode current collector can be conventional metal foil or a composite current collector (a metal material can be provided on a polymer matrix to form a composite current collector). In an example, the negative-electrode current collector may be copper foil.

In the secondary battery in this application, the first artificial graphite and the second artificial graphite may be different in at least one of parameters such as degree of graphitization, particle size distribution, particle morphology, and tap density. The first negative-electrode active material and the second negative-electrode active material in this application may be different in material composition or material type.

In the secondary battery in this application, usually, the first negative-electrode film layer or the second negative-electrode film layer further optionally includes a binder, a conductive agent, and other adjuvant. Negative-electrode film layer slurries are usually formed by dispersing the negative-electrode active material, and the optional binder, conductive agent, and other adjuvant in a solvent and stirring them evenly. The solvent may be, for example, N-methylpyrrolidone (NMP) or deionized water. The other optional adjuvant may be, for example, a thickening and dispersing agent (such as sodium carboxymethyl cellulose CMC-Na) and a PTC thermistor material.

In an example, the conductive agent in the first negative-electrode film layer or the second negative-electrode film layer may include one or more of superconducting carbon, acetylene black, conductive carbon black, Ketjen black, carbon dots, carbon nanotubes, graphene, and carbon fibers. Optionally, a mass proportion of the conductive agent in the first negative-electrode film layer or the second negative-electrode film layer is less than or equal to 5%.

In an example, the binder in the first negative-electrode film layer or the second negative-electrode film layer may include one or more of styrene butadiene rubber (SBR), polyvinylidene fluoride (PVDF), polyvinylidene fluoride copolymer (such as polyvinylidene fluoride-hexafluoropropylene), polystyrene, polyacrylic acid, polytetrafluoroethylene, polyacrylonitrile, polyimide, polyurethane, polyvinyl alcohol, polyvinyl butyral (PVB), polyacrylate, acrylic acid-acrylonitrile copolymer, ethylene-vinyl acetate copolymer (EVA), and acrylate-acrylonitrile copolymer. Optionally, a mass proportion of the binder in the first negative-electrode film layer or the second negative-electrode film layer is less than or equal to 5%.

In some embodiments, a thickness of the negative-electrode film layer is greater than or equal to 60 μm, and for example, may be 65-80 μm. It should be noted that the thickness of the negative-electrode film layer is a sum of the thicknesses of the first negative-electrode film layer and the second negative-electrode film layer each applied on a single surface of the negative-electrode current collector.

In some embodiments, a thickness ratio of the second negative-electrode film layer to the first negative-electrode film layer is 1:1-3:2. The thickness ratio of the first and second negative-electrode film layers within the given range is conducive to forming a gradient pore distribution in the upper and lower layers, so that liquid phase conduction resistance of active ions deintercalated from the positive electrode on the surface of the negative-electrode film layer is reduced, ions are not accumulated in the surface layer to cause lithium plating, and uniform diffusion of the active ions in the film layer helps to reduce polarization, which can further improve the fast charging performance and cycling performance of the battery.

In some embodiments, a surface density of the negative-electrode film layer is greater than or equal to 0.117 mg/mm$^2$, and for example, may be 0.117-0.13 mg/mm$^2$ or 0.119-0.13 mg/mm$^2$. It should be noted that the surface density of the negative-electrode film layer is a surface density of the entire negative-electrode film layer (that is, a sum of the surface densities of the first negative-electrode film layer and the second negative-electrode film layer).

In some embodiments, a press density of the negative-electrode film layer is 1.4-1.75 g/cm$^3$, and for example, may be 1.65-1.75 g/cm$^3$, or 1.55-1.7 g/cm$^3$. It should be noted that the press density of the negative-electrode film layer is a press density of the entire negative-electrode film layer that includes the first negative-electrode film layer and the second negative-electrode film layer, applied on a single surface of the negative-electrode current collector. The press density of the negative-electrode film layer within a given range enables the negative-electrode plate to have a high reversible capacity, and also have good low cycle swelling performance and kinetic performance, thereby further improving the energy density, fast charging capability, and cycling performance of the battery.

In this application, all of the foregoing negative-electrode active materials can be available commercially.

Figure 3:
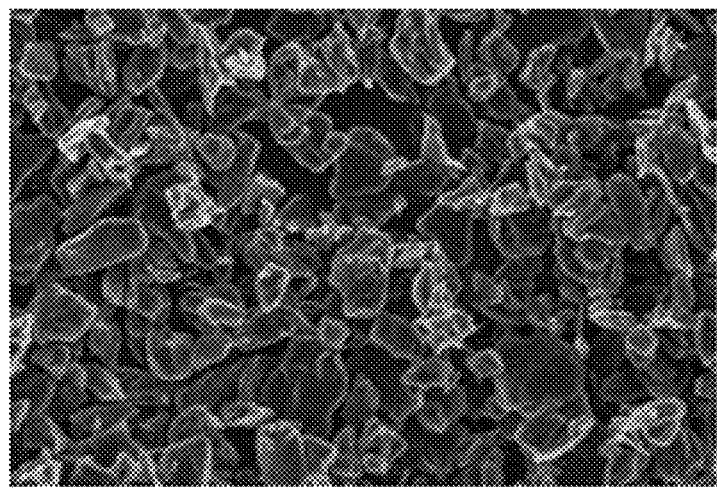
FIG. 3 is an SEM image of an embodiment of a first negative-electrode active material.
Figure 4:
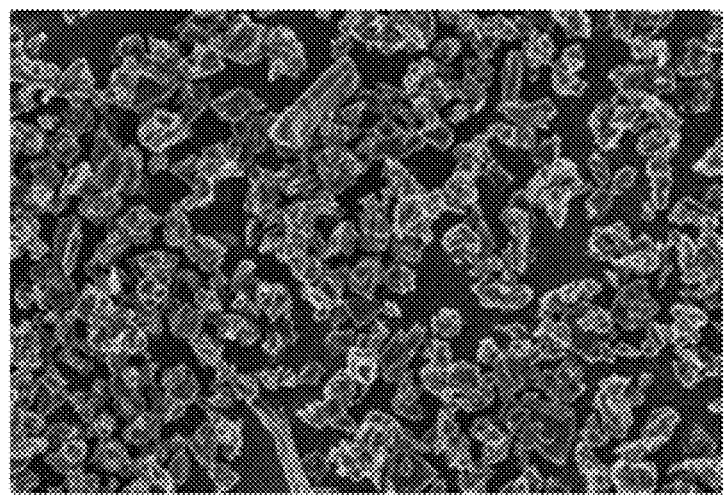
FIG. 4 is an SEM image of an embodiment of a second negative-electrode active material.

In this application, primary particles and secondary particles have meanings well known in the art. The primary particles are particles not in agglomeration. The secondary particles are particles in agglomeration formed by accumulating two or more primary particles. The primary particles and the secondary particles can be easily distinguished by taking SEM images using a scanning electron microscope. For example, FIG. 3 shows an SEM image of an embodiment of a first negative-electrode active material, and FIG. 4 shows an SEM image of an embodiment of a second negative-electrode active material.

A quantity proportion of the primary particles or the secondary particles in the negative-electrode active material can be measured by methods known in the art, and for example, can be determined by using a scanning electron microscope. In an example, a method for measuring the quantity proportion of the secondary particles can be as follows: laying and sticking the negative-electrode active material on a conductive adhesive to make a to-be-tested sample with length×width=6 cm×1.1 cm; and using a scanning electron microscope (such as ZEISS Sigma300) to test the particle morphology. The test may be carried out with reference to JY/T010-1996. To ensure accuracy of the test results, a number of (for example, 5) different regions in the to-be-tested sample may be randomly selected for scanning test, and with a specified magnification (for example, 500 times or 1000 times), a percentage of the number of secondary particles to a total number of particles in each of the test regions is calculated as the quantity proportion of the secondary particles in the region. An average value of the calculated results of the number of test regions is taken as the quantity proportion of the secondary particles in the negative-electrode active material. To ensure accuracy of the test results, a number of (for example, 10) test samples can be taken to repeat the foregoing test, and an average value of the test samples is taken as a final test result. Similarly, a test for a quantity proportion of the primary particles in the negative-electrode active material can also be carried out.

In this application, $D_v10$, $D_v50$, and $D_v90$ of the negative-electrode active material all have meanings well known in the art, and can be measured by methods known in the art. For example, a test may be carried out with reference to the standard GB/T 19077.1-2016 by using a laser particle size analyzer (for example, Malvern Master Size 3000).

Physical definitions of $D_v10$, $D_v50$, and $D_v90$ are as follows:

$D_v10$: a particle size at which a cumulative volume distribution percentage of the negative-electrode active material reaches 10%;

$D_v50$: a particle size at which a cumulative volume distribution percentage of the negative-electrode active material reaches 50%; and $D_v90$: a particle size at which a cumulative volume distribution percentage of the negative-electrode active material reaches 90%.

In this application, the particle size uniformity of the negative-electrode active material has a meaning well known in the art. Specifically, the particle size uniformity of the negative-electrode active material may characterize a degree of dispersion of particle sizes of all particles in the negative-electrode active material deviated from the volume-based median particle size ($D_v50$) of the negative-electrode active material, which reflects uniformity of particle size distribution of the negative-electrode active material.

The particle size uniformity of the negative-electrode active material can be measured by methods known in the art. For example, a test may be carried out with reference to the standard GB/T 19077.1-2016 by using a laser particle size analyzer (for example, Malvern Master Size 3000).

In this application, an OI value of the negative-electrode active material has a meaning well known in the art, and can be measured by methods known in the art. For example, an X-ray diffraction pattern of the negative-electrode active material may be obtained by using an X-ray powder diffractometer (for example, Bruker D8 Discover) according to JIS K 0131-1996 and JB/T4220-2011; and then a powder OI value of the negative-electrode active material is calculated according to OI value=$C_{004}/C_{110}$, where $C_{004}$ is a peak area of a characteristic diffraction peak of graphite 004 crystal plane, and $C_{110}$ is a peak area of a characteristic diffraction peak of graphite 110 crystal plane.

In the X-ray diffraction analysis test of this application, a copper target can be used as the anode target, with CuKα rays as a radiation source, a ray wavelength λ=1.5418 Å, a scanning 2θ angle range of 20°-80°, and a scanning rate of 4°/min.

In this application, the specific surface area (Specific surface area, SSA) of the negative-electrode active material has a meaning well known in the art, and can be measured by methods known in the art. For example, the specific surface area can be measured according to GB/T 19587-2017 by using the nitrogen adsorption specific surface area analysis test method and calculated by using the BET (Brunauer Emmett Teller) method. The nitrogen adsorption specific surface area analysis test may be carried out by using the Tri-Star 3020 specific surface area and pore size analyzer from Micromeritics Company in USA.

In this application, the thickness of the negative-electrode film layer may be measured with a ten-thousandths micrometer. For example, a ten-thousandths micrometer of model Mitutoyo293-100 with 0.1 μm resolution may be used.

In this application, respective thicknesses of the primer layer, the first negative-electrode film layer, and the second negative-electrode film layer can be measured by using a scanning electron microscope (for example, ZEISS Sigma300). In an example, the test method may be as follows: first, cutting the negative-electrode plate into to-be-tested samples with a specified size (for example, 2 cm×2 cm), and fixing the negative-electrode plates on a sample stage by paraffin; and then loading the sample stage into a sample holder and locking the sample stage in place, powering on an argon ion cross-section polisher (for example, IB-19500CP) and evacuating the polisher (for example, $10^{-4}$ Pa), setting an argon flow (for example, 0.15 MPa), a voltage (for example, 8 KV), and a polishing time (for example, 2 hours), and adjusting the sample stage to rocking mode to start polishing. The sample test may be carried out with reference to JY/T010-1996. To ensure accuracy of the test results, a number of (for example, 10) different regions in a to-be-tested sample may be randomly selected for scanning test, and with a specified magnification (for example, 500 times), respective thicknesses of the primer layer, the first negative-electrode film layer, and the second negative-electrode film layer in the test regions are read from the scale, and average values of the respective test results of the number of test regions are taken as the respective thicknesses of the primer layer, the first negative-electrode film layer, and the second negative-electrode film layer.

In this application, the surface density of the negative-electrode film layer has a meaning well known in the art, and can be measured by methods known in the art. In an example, the test method may be as follows: taking a negative-electrode plate that has been coated on one side and has been cold pressed (for a negative-electrode plate coated on both sides, wiping off the negative-electrode film layer on one side first), and punching the negative-electrode plate into small discs with an area of S1, weighing the negative-electrode plate, and recording its weight as M1; and then wiping off the negative-electrode film layer of the weighted negative-electrode plate, weighing the negative-electrode current collector, and recording its weight as M0, so that the surface density of the negative-electrode film layer=(weight M1 of the negative-electrode plate−weight M0 of the negative-electrode current collector)/S1. To ensure accuracy of the test results, a number of sets (for example, 10 sets) of to-be-tested samples can be tested, and their average value is calculated as the test result.

In this application, the press density of the negative-electrode film layer has a meaning well known in the art, and can be measured by methods known in the art. For example, the surface density and thickness of the negative-electrode film layer are first obtained according to the foregoing test methods, so that the press density of the negative-electrode film layer=the surface density of the negative-electrode film layer/the thickness of the negative-electrode film layer.

It should be noted that for the foregoing various parameters, samples can be taken and tested during battery preparation, or can be taken from a prepared secondary battery and tested.

In an example, if the foregoing test samples are to be taken from a prepared secondary battery, the samples can be taken by the following steps.

(1) The secondary battery is discharged (for safety reasons, the battery is usually fully discharged), the battery is disassembled to remove the negative-electrode plate, and the negative-electrode plate is soaked for a period of time (for example, 2-10 hours) by using dimethyl carbonate (DMC); and then the negative-electrode plate is taken out and dried at a specified temperature for a specified time (for example, at 60° C. for 4 hours), and the negative electrode is taken out after drying. In this case, the samples can be taken from the dried negative-electrode plate to test the foregoing various parameters related to the negative-electrode film layer in this application (for example, the surface density, press density, thickness of the negative-electrode film layer).

(2) The dried negative-electrode plate in step (1) is baked at a specified temperature for a specified time (for example, at 400° C. for 2 hours), and a region is randomly selected in the baked negative-electrode plate for sampling the second negative-electrode active material first (a blade can be taken for scraping powder as a sample), with a scraping depth not exceeding a boundary area between the first negative-electrode film layer and the second negative-electrode film layer; and then the first negative-electrode active material is sampled in the same way. Because during the preparation of the negative-electrode film layer, there may be an intermixing layer in the boundary area between the first negative-electrode film layer and the second negative-electrode film layer (that is, both the first negative-electrode active material and the second negative-electrode active material exist in the intermixing layer). For the accuracy of the test, when sampling the first negative-electrode active material, the intermixing layer can be scraped off first, and then a powder sample can be scraped from the first negative-electrode active material.

(3) The first negative-electrode active material and the second negative-electrode active material collected in step (2) are respectively screened (for example, sieved with a 200-mesh sieve), and finally the first negative-electrode active material sample and the second negative-electrode active material sample that can be used to test the foregoing various material parameters in this application (for example, material morphology, particle size, specific surface area) are obtained.

In the foregoing sampling process, an optical microscope or a scanning electron microscope can be used to assist in determining a location of the boundary area between the first negative-electrode film layer and the second negative-electrode film layer.

In addition, it should be noted that the parameters of the primer layer and the negative-electrode film layer that are given in this application, such as the thickness of the primer layer, the thickness of the negative-electrode film layer, the surface density of the negative-electrode film layer, and the press density of the negative-electrode film layer, all indicate parameter ranges of a film layer on a single surface. When the primer layer or the negative-electrode film layer is provided on both surfaces of the negative-electrode current collector, parameters of the primer layer or the negative-electrode film layer on any surface being compliant with this application are considered to fall within the protection scope of this application. In addition, ranges of the thickness, the surface density, and the like of the negative-electrode film layer in this application all indicate parameters of a cold pressed film layer used for assembling the battery.

[Positive-Electrode Plate]

In the secondary battery in this application, the positive-electrode plate includes a positive-electrode current collector, and a positive-electrode film layer that is provided on at least one surface of the positive-electrode current collector and that includes a positive-electrode active material.

It can be understood that the positive-electrode current collector has two opposite surfaces in a thickness direction of the positive-electrode current collector, and the positive-electrode film layer can be laminated on either or both of the two opposite surfaces of the positive-electrode current collector.

In the secondary battery in this application, the positive-electrode current collector can be conventional metal foil or a composite current collector (a metal material can be provided on a polymer matrix to form a composite current collector). In an example, the positive-electrode current collector may be aluminum foil.

In the secondary battery in this application, the positive-electrode active material may be a positive-electrode active material for secondary batteries that is well known in the art. For example, the positive-electrode active material may include one or more of lithium transition metal oxides, lithium-containing phosphates with an olivine structure, and respective modified compounds thereof. Examples of the lithium transition metal oxides may include but are not limited to one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides, and modified compounds thereof. Examples of the lithium-containing phosphates with an olivine structure may include but are not limited to one or more of lithium iron phosphate, composite materials of lithium iron phosphate and carbon, lithium manganese phosphate, composite materials of lithium manganese phosphate and carbon, lithium iron manganese phosphate, composite materials of lithium iron manganese phosphate and carbon, and modified compounds thereof. This application is not limited to these materials, and other conventionally well-known materials that can be used as a positive-electrode active material for secondary batteries may also be used.

In some embodiments, to further improve the energy density of the battery, the positive-electrode active material may include one or more of the lithium transition metal oxides represented by formula 1 and modified compounds thereof:

$$Li_aNi_bCo_cM_dO_eA_f \qquad \text{formula 1.}$$

In the formula 1, $0.8 \leq a \leq 1.2$, $0.5 \leq b < 1$, $0 < c < 1$, $0 < d < 1$, $1 \leq e \leq 2$, $0 \leq f \leq 1$, M is selected from one or more of Mn, Al, Zr, Zn, Cu, Cr, Mg, Fe, V, Ti, and B, and A is selected from one or more of N, F, S, and Cl.

In this application, the modified compounds of the foregoing materials may be obtained through modification by doping and/or surface coating the materials.

In the secondary battery in this application, the positive-electrode film layer further optionally includes a binder and a conductive agent.

In an example, the binder for the positive-electrode film layer may include one or more of polyvinylidene fluoride (PVDF) and polytetrafluoroethylene (PTFE).

In an example, the conductive agent for the positive-electrode film layer may include one or more of superconducting carbon, acetylene black, carbon black, Ketjen black, carbon dots, carbon nanotubes, graphene, and carbon nanofibers.

[Electrolyte]

The electrolyte plays a role of conducting ions between the positive-electrode plate and the negative-electrode plate. This application imposes no limitation on a type of the electrolyte, which may be selected as required. For example, the electrolyte may be selected from at least one of solid electrolyte and liquid electrolyte (that is, electrolyte solution).

In some embodiments, the electrolyte uses an electrolyte solution. The electrolyte solution includes an electrolytic salt and a solvent.

In some embodiments, the electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bisfluorosulfonylimide), LiTFSI (lithium bistrifluoromethanesulfonimide), LiTFS (lithium trifluoromethanesulfonate), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In some embodiments, the electrolyte solution further optionally includes an additive. For example, the additive may include a negative electrode film forming additive, or may include a positive electrode film-forming additive, or may include an additive capable of improving some performance of a battery, for example, an additive for improving over-charge performance of the battery, an additive for improving high-temperature performance of the battery, and an additive for improving low-temperature performance of the battery.

[Separator]

Secondary batteries with electrolyte solutions and some secondary batteries with solid electrolytes also include separators. The separator is disposed between the positive-electrode plate and the negative-electrode plate for isolation. This application imposes no particular limitation on a type of the separator, which may be any well-known porous separator with good chemical stability and mechanical stability.

In some embodiments, a material of the separator may be selected from one or more of glass fiber, non-woven fabric, polyethylene, polypropylene, and polyvinylidene fluoride. The separator may be a single-layer film or a multi-layer composite film. When the separator is a multi-layer composite film, all layers may be made of the same or different materials.

In some embodiments, the positive-electrode plate, negative-electrode plate, and separator may be used to prepare an electrode assembly through winding or lamination.

In some embodiments, the secondary battery may include an outer package. The outer package may be used for packaging the foregoing electrode assembly and electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, one or more of polypropylene (PP), polybutylene terephthalate (PBT), and polybutylene succinate (PBS).

Figure 5:
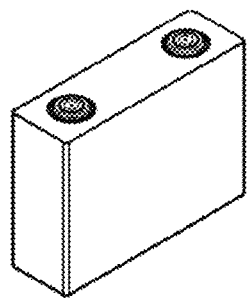
FIG. 5 is a schematic diagram of an embodiment of a secondary battery in this application.

This application imposes no particular limitation on a shape of the secondary battery, which may be cylinder-shaped, prism-shaped, or in any other shape. FIG. 5 shows a secondary battery 5 of a prism-shaped structure as an example.

Figure 6:
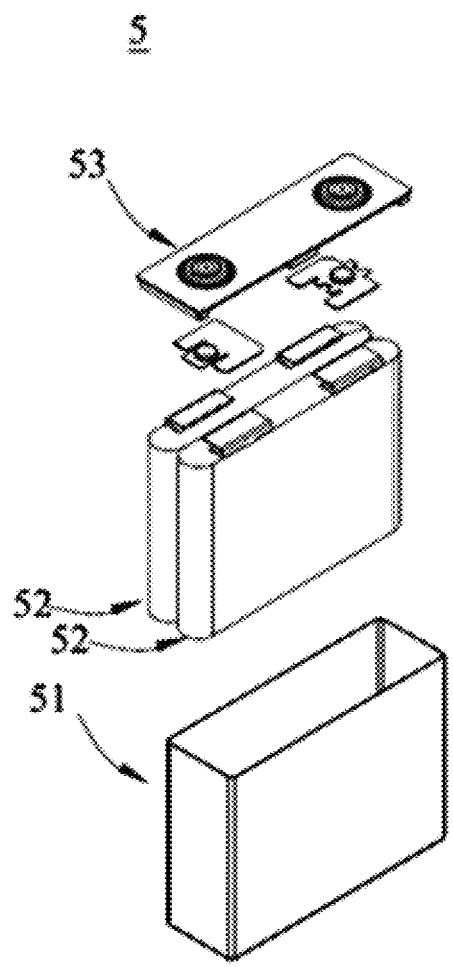
FIG. 6 is a schematic exploded view of the secondary battery in FIG. 5.

In some embodiments, with reference to FIG. 6, the outer package may include a housing 51 and a cover plate 53. The housing 51 may include a base plate and side plates connected onto the base plate, and the base plate and the side plates enclose an accommodating cavity. The housing 51 has an opening communicating with the accommodating cavity, and the cover plate 53 is used to cover the opening, to seal the accommodating cavity. A positive-electrode plate, a negative-electrode plate, and a separator may be used to form an electrode assembly 52 through winding or lamination. The electrode assembly 52 is packaged in the accommodating cavity. The electrolyte solution is infiltrated into the electrode assembly 52. There may be one or more electrode assemblies 52 in the secondary battery 5, and the quantity may be adjusted as required.

Preparation Method of Secondary Battery

A second aspect of this application provides a method for preparing a secondary battery, at least including a negative-electrode plate for the secondary battery prepared by the following steps:

(1) providing a primer layer on at least one side of a negative-electrode current collector;

(2) providing a first negative-electrode film layer on the primer layer; and (3) providing a second negative-electrode film layer on the first negative-electrode film layer.

The secondary battery includes a negative-electrode plate, the negative-electrode plate is of a multi-layer structure, and the multi-layer structure sequentially includes: a negative-electrode current collector, a primer layer, and a negative-electrode film layer; the negative-electrode film layer includes a first negative-electrode film layer and a second negative-electrode film layer, and the first negative-electrode film layer is located between the primer layer and the second negative-electrode film layer; and the first negative-electrode film layer includes a first negative-electrode active material, the first negative-electrode active material includes first artificial graphite, at least some particles in the first artificial graphite are secondary particles, and a quantity proportion A of the number of the secondary particles to a total number of particles of the first negative-electrode active material satisfies A≥50%.

In the foregoing preparation steps, the first negative-electrode film layer and the second negative-electrode film layer can be applied at the same time or separately. When the first negative-electrode film layer and the second negative-electrode film layer are applied at the same time, cohesiveness between the upper and lower negative-electrode film layers is better, helping to further improve the cycling performance of the battery.

Except for the preparation method of the negative-electrode plate in this application, other constructions and preparation methods of the secondary battery in this application are well known. For example, the positive-electrode plate in this application can be prepared by the following method: mixing and dispersing a positive-electrode active material, an optional conductive agent (for example, a carbon material such as carbon black), a binder (for example, PVDF), and the like in a solvent (for example, NMP), stirring a resulting mixture well, and applying the mixture evenly on a positive-electrode current collector, followed by drying, to obtain a positive-electrode plate. A metal foil such as aluminum foil or a material such as a porous metal plate may be used as the positive current collector. When preparing the positive-electrode plate, a positive electrode tab can be obtained by punching, laser die-cutting, or the like in an uncoated region of the positive-electrode current collector.

Finally, the positive-electrode plate, the separator, and the negative-electrode plate are stacked in sequence, so that the separator is placed between the positive and negative-electrode plates for isolation, and then winding (or lamination) process is performed to obtain an electrode assembly. The electrode assembly is placed into an outer package and dried, and the electrolyte solution is injected. After vacuum packaging, standing, formation, shaping, and other processes, a secondary battery is obtained.

Battery Module

In some embodiments, optionally, secondary batteries may be assembled into a battery module, and the battery module may include a plurality of secondary batteries. A specific quantity may be adjusted based on application and capacity of the battery module.

Figure 7:
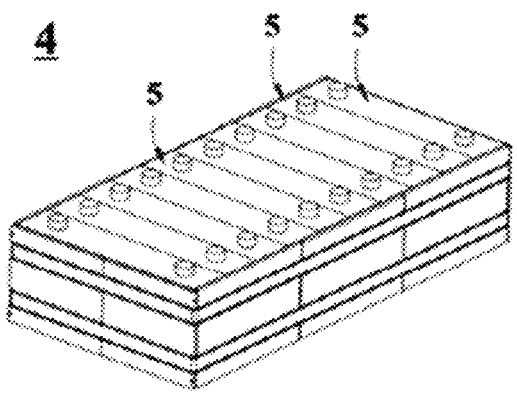
FIG. 7 is a schematic diagram of an embodiment of a battery module.

FIG. 7 shows a battery module 4 used as an example. Referring to FIG. 7, in the battery module 4, a plurality of secondary batteries 5 may be sequentially arranged in a length direction of the battery module 4. Certainly, the secondary batteries 5 may alternatively be arranged in any other manner. Further, the plurality of secondary batteries 5 may be fastened by using fasteners.

Optionally, the battery module 4 may further include a housing with an accommodating space, and the plurality of secondary batteries 5 are accommodated in the accommodating space.

Battery Pack

In some embodiments, optionally, the battery module may be further assembled into a battery pack, and a quantity of battery modules included in the battery pack may be adjusted based on application and capacity of the battery pack.

Figure 8:
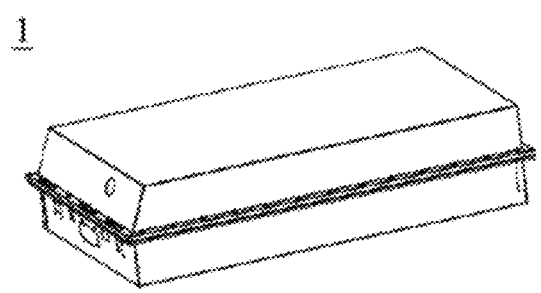
FIG. 8 is a schematic diagram of an embodiment of a battery pack.
Figure 9:
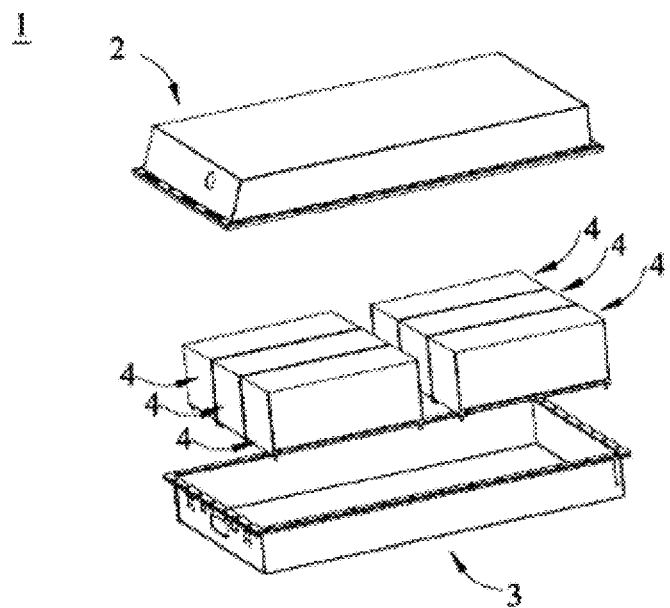
FIG. 9 is an exploded view of FIG. 8.

FIG. 8 and FIG. 9 show a battery pack 1 used as an example. Referring to FIG. 8 and FIG. 9, the battery pack 1 may include a battery box and a plurality of battery modules 4 arranged in the battery box. The battery box includes an upper box body 2 and a lower box body 3. The upper box body 2 is used to cover the lower box body 3 to form an enclosed space for accommodating the battery modules 4. The plurality of battery modules 4 may be arranged in the battery box in any manner.

Apparatus

A third aspect of this application provides an apparatus. The apparatus includes at least one of the secondary battery, the battery module, or the battery pack in this application. The secondary battery, battery module, or battery pack may be used as a power source of the apparatus, or an energy storage unit of the apparatus.

The apparatus may include but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 10:
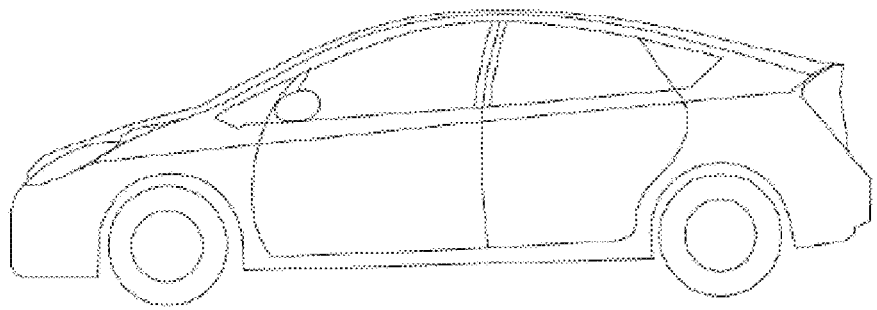
FIG. 10 is a schematic diagram of an embodiment of an apparatus using the secondary battery in this application as a power source.

FIG. 10 shows an apparatus used as an example. The apparatus is a battery electric vehicle, a hybrid electric vehicle, a plug-in hybrid electric vehicle, or the like. To meet a requirement of the apparatus for high rate and high energy density of the secondary battery, a battery pack or a battery module may be used.

In another example, the apparatus may be a mobile phone, a tablet computer, a notebook computer, or the like. The apparatus is usually required to be light and thin, and may use the secondary battery as a power source.

Beneficial effects of this application are further described below with reference to embodiments.

EXAMPLES

To make the invention objectives, technical solutions, and beneficial technical effects of this application clearer, this application is further described below in detail with reference to examples. However, it should be understood that the example of this application are merely intended to explain this application, but not to limit this application, and the examples of this application are not limited to the examples given in this specification. In examples in which specific experimental conditions or operating conditions are not specified, preparation is performed according to conventional conditions or according to conditions recommended by a material supplier.

I. Preparation of a Battery for Testing

Example 1

(1) Preparation of a Positive-Electrode Plate

A positive-electrode active material $LiNi_{0.8}Co_{0.1}Mn_{0.1}O_2$ (NCM811), conductive carbon black Super-P, and a binder polyvinylidene fluoride (PVDF) were fully stirred and evenly mixed in an N-methylpyrrolidone solvent at a weight ratio of 96.8:1:2.2, to obtain a slurry, and the slurry was applied onto an aluminum foil matrix, then processes such as drying, cold pressing, slitting, and cutting were performed to obtain a positive-electrode plate. A surface density of the positive-electrode film layer was 0.196 mg/mm$^2$, and a press density was 3.5 g/cm$^3$.

(2) Preparation of a Negative-Electrode Plate

Step 1. Primer layer: Conductive carbon black (Super-P), a binder (SBR), and a thickener (CMC-Na) were dissolved at a ratio of 62.5:33.8:3.7 in deionized water, fully stirred and mixed to form a primer slurry. The primer layer was evenly applied on two surfaces of the current collector, and the primer layer was dried. The thickness of the primer layer was 3 μm.

Step 2. Preparation of a negative electrode slurry 1: The first negative-electrode active material, a binder (SBR), a thickener (CMC-Na), and conductive carbon black (Super-P) were mixed at a weight ratio of 96.2:1.8:1.2:0.8, fully stirred and mixed in an appropriate amount of deionized water to prepare a negative electrode slurry 1. A quantity proportion A of the secondary particles in the first negative-electrode active material is 50%.

Step 3. Preparation of a negative electrode slurry 2: The second negative-electrode active material, a binder (SBR), a thickener (CMC-Na), and conductive carbon black (Super-P) were mixed at a weight ratio of 96.2:1.8:1.2:0.8, fully stirred and mixed in an appropriate amount of deionized water to prepare a negative electrode slurry 2. A quantity proportion B of the secondary particles in the second negative-electrode active material is 90%.

Step 4. The negative electrode slurry 1 and the negative electrode slurry 2 were simultaneously extruded by using a double-chamber coating device. The negative electrode slurry 1 was applied onto a current collector to form a first negative-electrode film layer, and the negative electrode slurry 2 was applied onto the first negative-electrode film layer to form a second negative-electrode film layer. A surface density of the negative-electrode film layer was 0.123 mg/mm$^2$, and a press density was 1.65 g/cm$^3$.

Step 5. Processes such as baking, cold pressing, slitting, and cutting were performed on the negative-electrode plate prepared in step 4 to obtain a negative-electrode plate.

(3) Separator

PE film was used as a separator.

(4) Preparation of an Electrolyte Solution

Ethylene carbonate (EC), ethyl methyl carbonate (EMC), and diethyl carbonate (DEC) were mixed at a volume ratio of 1:1:1, and then a fully dried lithium salt $LiPF_6$ was dissolved in a mixed organic solvent based on a proportion of 1 mol/L to obtain an electrolyte solution.

(5) Preparation of a Battery

The positive-electrode plate, the separator, and the negative-electrode plate were stacked in sequence and wound to obtain an electrode assembly. The electrode assembly was placed in an outer package, the electrolyte solution was injected, and processes such as packaging, standing, formation, and aging were performed to obtain a secondary battery.

Preparation methods of the secondary batteries in Examples 2 to 44 and Comparative Examples 1 to 6 were similar to the preparation method of the secondary battery in Example 1, but compositions and product parameters of the negative-electrode plates were varied. For details about different product parameters, see Tables 2.

II. Performance Parameter Test Method

1. Fast Charging Performance Test

At 25° C., batteries in Examples and Comparative Examples were charged and discharged for the first time with a current of 1 C (that is, a current value at which a theoretical capacity was completely discharged within 1 hour), where the charging was constant-current and constant-voltage charging, an end voltage was 4.25 V, a cut-off current was 0.05 C, and an end-of-discharge voltage was 2.8 V; and a theoretical capacity of the battery was recorded as C0. Then the batteries were charged to an all-electric cut-off voltage of 4.25 V or a negative electrode cut-off potential of 0 V sequentially with constant currents of 0.5 C0, 1 C0, 1.5 C0, 2 C0, 2.5 C0, 3 C0, 3.5 C0, 4 C0, and 4.5 C0. After completion of each charging, the batteries needed to be discharged to 2.8 V at 1 C0. Corresponding anode potentials were recorded when the batteries were charged to 10%, 20%, 30%, . . . , and 80% SOC states at different charging rates, rate-anode potential curves under different SOC states were drawn, and linear fitting was performed to obtain corresponding charging rates under different SOC states when an anode potential is 0 V, where such charging rates were charging windows under the SOC states, and were denoted as $C_{10\%SOC}$, $C_{20\%SOC}$, $C_{30\%SOC}$, $C_{40\%SOC}$, $C_{50\%SOC}$, $C_{60\%SOC}$, $C_{70\%SOC}$, and $C_{80\%SOC}$. Based on a formula $(60/C_{20\%SOC}+60/C_{30\%SOC}+60/C_{40\%SOC}+60/C_{50\%SOC}+60/C_{60\%SOC}+60/C_{70\%SOC}+60/C_{80\%SOC})\times 10\%$, a charging time T for charging the battery from 10% SOC to 80% SOC was calculated. A shorter time indicates better fast charging performance of the battery.

(2) Cycling Performance Test

At 25° C., the prepared secondary batteries in Examples and Comparative Examples were charged at a constant current of 0.33 C to a charging cut-off voltage of 4.25 V, charged to a current of 0.05 C at a constant voltage, left standing for 5 minutes, and then discharged at a constant current of 0.33 C to a discharging cut-off voltage of 2.8 V. An initial capacity of each battery was recorded as C0. Then the batteries were charged according to the strategy in Table 1, and discharged at 0.33 C. A discharge capacity Cn at each cycle was recorded until a cycling capacity retention rate (Cn/C0×100%) was 80%, and the number of cycles was recorded. A higher number of cycles means a longer cycle life of a battery.

TABLE 1

| State of charge SOC of the battery | Charging rate (C) |
| --- | --- |
| 0-10% | 0.33 |
| 10%-20% | 4 |
| 20%-30% | 3 |
| 30%-40% | 2.4 |
| 40%-50% | 2 |
| 50%-60% | 1.6 |
| 60%-70% | 1.4 |
| 70%-80% | 1 |
| 80%-100% | 0.33 |

III. Test Results of Examples and Comparative Examples

Batteries in Examples and Comparative Examples were prepared according to the foregoing methods, and performance parameters were measured. Results were shown in the Table 2.

First, it can be learned from the data in Examples 1 to 6 and Comparative Examples 5 and 6, in a case that the primer layer was provided, only when a quantity proportion A of artificial graphite with a secondary particle morphology in a total number of particles of the first negative-electrode active material was greater than or equal to 50%, both good cycling performance and good fast charging performance of the obtained secondary battery can be guaranteed. In addition, it can be learned from the data in Examples 1 to 6 and Comparative Examples 3 and 4: When A≥50% and no primer layer was provided, the cycling performance of the battery cannot be guaranteed. In Comparative Examples 1 and 2, neither the primer layer was provided, nor a large proportion of artificial graphite with a secondary particle morphology was used in the first negative-electrode active material layer, and both the fast charging performance and the cycling performance in this case were very poor.

The test data of Examples 7 to 13 shows that: When the volume-based median particle size $D_v50$ of the first negative-electrode active material satisfies $D_v50 \geq 15$ μm, and in particular, 17 μm$\leq D_v50 \leq 23$ μm, the battery performance is better.

The test data of Examples 14 to 19 shows that: When the particle size uniformity of the first negative-electrode active material is in a range from 0.25 to 0.45, the battery performance is excellent.

The test data of Examples 20 to 23 shows that: When the mass proportion of the conductive agent in the primer layer is greater than or equal to 50%, and in particular, in a range from 55% to 70%, the battery performance is excellent.

The test data of Examples 24 to 41 shows that: To further improve the battery performance, the secondary negative-electrode active material preferably also includes artificial graphite with a secondary particle morphology, and the quantity proportion B of the number of the secondary particles to a total number of particles of the second negative-electrode active material preferably satisfies B≥50%, preferably, B≥60%, and more preferably, 80%≤B≤100%; the volume-based median particle size $D_v50$ of the second negative-electrode active material satisfies 7 μm≤$D_v$50≤15 μm; and the particle size uniformity of the second negative-electrode active material is preferably in a range from 0.20 to 0.50, and more preferably, in a range from 0.25 to 0.4.

The test data of Examples 42 to 44 shows that: In the secondary battery in this application, both or either the first negative-electrode active material and/or the second negative-tive-electrode active material may include optional other negative-electrode active materials.

According to the disclosure and teaching of this specification, a person skilled in the art of this application may further make appropriate changes or modifications to the foregoing examples. Therefore, this application is not limited to the specific examples disclosed and described above, and modifications and changes to this application also fall within the protection scope of the claims of this application. In particular, as long as there is no conflict, the various technical features mentioned in the examples can be combined in any manner.

TABLE 2

Measurement results and performance comparison of Examples 1 to 44 and Comparative Examples 1 to 6

| | Negative-electrode plate | | | | | | | | | |
|---|---|---|---|---|---|---|---|---|---|---|
| | | First negative-electrode film layer (lower film layer) First negative-electrode active | | | | Second negative-electrode film layer (upper film layer) Second negative-electrode active | | | | |
| | Primer layer Coating | Composition of first | Quantity | | | Compositions of second | Quantity | | | Battery performance |
| No. | mass ratio (conductive agent:binder: thickener) | negative-electrode active material | proportion A of secondary particles | $D_v50$ (μm) | Particle size uniformity | negative-electrode active material | proportion B of secondary particles | $D_v50$ (μm) | Particle size uniformity | Fast charging capability (min) / Cycling performance (cycles) |
| Example 1 | 62.5:33.8:3.7 | First artificial graphite | 50% | 16.5 | 0.31 | Second artificial graphite | 90% | 11.5 | 0.35 | 22.5 / 2304 |
| Example 2 | 62.5:33.8:3.7 | First artificial graphite | 60% | 16.5 | 0.31 | Second artificial graphite | 90% | 11.5 | 0.35 | 21.3 / 2351 |
| Example 3 | 62.5:33.8:3.7 | First artificial graphite | 75% | 16.5 | 0.31 | Second artificial graphite | 90% | 11.5 | 0.35 | 20.7 / 2382 |
| Example 4 | 62.5:33.8:3.7 | First artificial graphite | 85% | 16.5 | 0.31 | Second artificial graphite | 90% | 11.5 | 0.35 | 18.3 / 2416 |
| Example 5 | 62.5:33.8:3.7 | First artificial graphite | 90% | 16.5 | 0.31 | Second artificial graphite | 90% | 11.5 | 0.35 | 17.9 / 2425 |
| Example 6 | 62.5:33.8:3.7 | First artificial graphite | 95% | 16.5 | 0.31 | Second artificial graphite | 90% | 11.5 | 0.35 | 17.5 / 2431 |
| Example 7 | 62.5:33.8:3.7 | First artificial graphite | 90% | 14.6 | 0.31 | Second artificial graphite | 90% | 11.5 | 0.35 | 18.9 / 2412 |
| Example 8 | 62.5:33.8:3.7 | First artificial graphite | 90% | 15.4 | 0.31 | Second artificial graphite | 90% | 11.5 | 0.35 | 19.5 / 2426 |
| Example 9 | 62.5:33.8:3.7 | First artificial graphite | 90% | 17.5 | 0.31 | Second artificial graphite | 90% | 11.5 | 0.35 | 21.4 / 2431 |
| Example 10 | 62.5:33.8:3.7 | First artificial graphite | 90% | 18.4 | 0.31 | Second artificial graphite | 90% | 11.5 | 0.35 | 22.1 / 2443 |
| Example 11 | 62.5:33.8:3.7 | First artificial graphite | 90% | 19.5 | 0.31 | Second artificial graphite | 90% | 11.5 | 0.35 | 23.3 / 2456 |
| Example 12 | 62.5:33.8:3.7 | First artificial graphite | 90% | 22.5 | 0.31 | Second artificial graphite | 90% | 11.5 | 0.35 | 24.5 / 2464 |
| Example 13 | 62.5:33.8:3.7 | First artificial graphite | 90% | 24.5 | 0.31 | Second artificial graphite | 90% | 11.5 | 0.35 | 26.3 / 2472 |
| Example 14 | 62.5:33.8:3.7 | First artificial graphite | 90% | 16.1 | 0.25 | Second artificial graphite | 90% | 11.5 | 0.35 | 16.8 / 2443 |
| Example 15 | 62.5:33.8:3.7 | First artificial graphite | 90% | 16.2 | 0.27 | Second artificial graphite | 90% | 11.5 | 0.35 | 17.1 / 2437 |

TABLE 2-continued

Measurement results and performance comparison of Examples 1 to 44 and Comparative Examples 1 to 6

| | | Negative-electrode plate | | | | | | | | |
|---|---|---|---|---|---|---|---|---|---|---|
| | | First negative-electrode film layer (lower film layer) First negative-electrode active | | | | Second negative-electrode film layer (upper film layer) Second negative-electrode active | | | | |
| | Primer layer Coating | Composition of first | Quantity | | | Compositions of second | Quantity | | | Battery performance |
| No. | mass ratio (conductive agent:binder: thickener) | negative-electrode active material | proportion A of secondary particles | $D_v50$ (μm) | Particle size uniformity | negative-electrode active material | proportion B of secondary particles | $D_v50$ (μm) | Particle size uniformity | Fast charging capability (min) | Cycling performance (cycles) |
| Example 16 | 62.5:33.8:3.7 | First artificial graphite | 90% | 16.4 | 0.3 | Second artificial graphite | 90% | 11.5 | 0.35 | 17.3 | 2426 |
| Example 17 | 62.5:33.8:3.7 | First artificial graphite | 90% | 16.7 | 0.34 | Second artificial graphite | 90% | 11.5 | 0.35 | 18.7 | 2393 |
| Example 18 | 62.5:33.8:3.7 | First artificial graphite | 90% | 17.2 | 0.41 | Second artificial graphite | 90% | 11.5 | 0.35 | 19.1 | 2376 |
| Example 19 | 53.4:43.9:2.7 | First artificial graphite | 90% | 16.5 | 0.31 | Second artificial graphite | 90% | 11.5 | 0.35 | 19.9 | 2413 |
| Example 20 | 45.3:49.9:4.8 | First artificial graphite | 90% | 16.5 | 0.31 | Second artificial graphite | 90% | 11.5 | 0.35 | 21.2 | 2430 |
| Example 21 | 58.6:39.3:2.1 | First artificial graphite | 90% | 16.5 | 0.31 | Second artificial graphite | 90% | 11.5 | 0.35 | 18.7 | 2422 |
| Example 22 | 64.9:33.2:1.9 | First artificial graphite | 90% | 16.5 | 0.31 | Second artificial graphite | 90% | 11.5 | 0.35 | 16.5 | 2339 |
| Example 23 | 65.5:32.5:2.0 | First artificial graphite | 90% | 16.5 | 0.31 | Second artificial graphite | 90% | 11.5 | 0.35 | 16.2 | 2345 |
| Example 24 | 62.5:33.8:3.7 | First artificial graphite | 90% | 16.5 | 0.31 | Second artificial graphite | 5% | 11.5 | 0.35 | 26.0 | 2331 |
| Example 25 | 62.5:33.8:3.7 | First artificial graphite | 90% | 16.5 | 0.31 | Second artificial graphite | 30% | 11.5 | 0.35 | 24.5 | 2356 |
| Example 26 | 62.5:33.8:3.7 | First artificial graphite | 90% | 16.5 | 0.31 | Second artificial graphite | 50% | 11.5 | 0.35 | 23.5 | 2363 |
| Example 27 | 62.5:33.8:3.7 | First artificial graphite | 90% | 16.5 | 0.31 | Second artificial graphite | 70% | 11.5 | 0.35 | 21.1 | 2371 |
| Example 28 | 62.5:33.8:3.7 | First artificial graphite | 90% | 16.5 | 0.31 | Second artificial graphite | 85% | 11.5 | 0.35 | 19.3 | 2393 |
| Example 29 | 62.5:33.8:3.7 | First artificial graphite | 90% | 16.5 | 0.31 | Second artificial graphite | 95% | 11.5 | 0.35 | 17.5 | 2433 |
| Example 30 | 62.5:33.8:3.7 | First artificial graphite | 90% | 16.5 | 0.31 | Second artificial graphite | 90% | 8.2 | 0.35 | 16.5 | 2459 |
| Example 31 | 62.5:33.8:3.7 | First artificial graphite | 90% | 16.5 | 0.31 | Second artificial graphite | 90% | 10.5 | 0.35 | 17.2 | 2445 |
| Example 32 | 62.5:33.8:3.7 | First artificial graphite | 90% | 16.5 | 0.31 | Second artificial graphite | 90% | 12.3 | 0.35 | 18.9 | 2412 |
| Example 33 | 62.5:33.8:3.7 | First artificial graphite | 90% | 16.5 | 0.31 | Second artificial graphite | 90% | 13.5 | 0.35 | 19.4 | 2403 |
| Example 34 | 62.5:33.8:3.7 | First artificial graphite | 90% | 16.5 | 0.31 | Second artificial graphite | 90% | 14.1 | 0.35 | 20.5 | 2387 |
| Example 35 | 62.5:33.8:3.7 | First artificial graphite | 90% | 16.5 | 0.31 | Second artificial graphite | 90% | 14.8 | 0.35 | 22.1 | 2377 |
| Example 36 | 62.5:33.8:3.7 | First artificial graphite | 90% | 16.5 | 0.31 | Second artificial graphite | 90% | 15.5 | 0.35 | 24.3 | 2363 |

TABLE 2-continued

Measurement results and performance comparison of Examples 1 to 44 and Comparative Examples 1 to 6

| | | Negative-electrode plate | | | | | | | | | |
|---|---|---|---|---|---|---|---|---|---|---|---|
| | | First negative-electrode film layer (lower film layer) First negative-electrode active | | | | Second negative-electrode film layer (upper film layer) Second negative-electrode active | | | | | |
| | Primer layer Coating | Composition of first | Quantity | | | Compositions of second | Quantity | | | Battery performance | |
| No. | mass ratio (conductive agent:binder:thickener) | negative-electrode active material | proportion A of secondary particles | $D_v50$ (μm) | Particle size uniformity | negative-electrode active material | proportion B of secondary particles | $D_v50$ (μm) | Particle size uniformity | Fast charging capability (min) | Cycling performance (cycles) |
| Example 37 | 62.5:33.8:3.7 | First artificial graphite | 90% | 16.5 | 0.31 | Second artificial graphite | 90% | 11.1 | 0.23 | 16.9 | 2456 |
| Example 38 | 62.5:33.8:3.7 | First artificial graphite | 90% | 16.5 | 0.31 | Second artificial graphite | 90% | 11.3 | 0.31 | 17.2 | 2437 |
| Example 39 | 62.5:33.8:3.7 | First artificial graphite | 90% | 16.5 | 0.31 | Second artificial graphite | 90% | 11.9 | 0.4 | 18.4 | 2411 |
| Example 40 | 62.5:33.8:3.7 | First artificial graphite | 90% | 16.5 | 0.31 | Second artificial graphite | 90% | 12.1 | 0.48 | 19.3 | 2393 |
| Example 41 | 62.5:33.8:3.7 | First artificial graphite | 90% | 16.5 | 0.31 | Second artificial graphite | 90% | 12.3 | 0.52 | 19.8 | 2375 |
| Example 42 | 62.5:33.8:3.7 | 60% first artificial graphite + 40% natural graphite | 54% | 17.5 | 0.28 | Second artificial graphite | 90% | 11.5 | 0.35 | 18.1 | 1823 |
| Example 43 | 62.5:33.8:3.7 | 80% first artificial graphite + 20% natural graphite | 72% | 17.5 | 0.29 | Second artificial graphite | 90% | 11.5 | 0.35 | 18.8 | 1892 |
| Example 44 | 62.5:33.8:3.7 | First artificial graphite | 90% | 16.5 | 0.31 | 95% second artificial graphite + 5% silicon monoxide | 82% | 11.3 | 0.29 | 20.2 | 1423 |
| Comparative Example 1 | / | First artificial graphite | 5% | 16.5 | 0.31 | Second artificial graphite | 90% | 11.5 | 0.35 | 37.1 | 1611 |
| Comparative Example 2 | / | First artificial graphite | 30% | 16.5 | 0.31 | Second artificial graphite | 90% | 11.5 | 0.35 | 35.4 | 1423 |
| Comparative Example 3 | / | First artificial graphite | 50% | 16.5 | 0.31 | Second artificial graphite | 90% | 11.5 | 0.35 | 34.3 | 1115 |
| Comparative Example 4 | / | First artificial graphite | 90% | 16.5 | 0.31 | Second artificial graphite | 90% | 11.5 | 0.35 | 31.0 | 834 |
| Comparative Example 5 | 62.5:33.8:3.7 | First artificial graphite | 5% | 16.5 | 0.31 | Second artificial graphite | 90% | 11.5 | 0.35 | 35.0 | 1631 |
| Comparative Example 6 | 62.5:33.8:3.7 | First artificial graphite | 30% | 16.5 | 0.31 | Second artificial graphite | 90% | 11.5 | 0.35 | 33.2 | 1523 |

What is claimed is:

1. A secondary battery, comprising a negative-electrode plate, wherein the negative-electrode plate is of a multi-layer structure, and the multi-layer structure sequentially comprises: a negative-electrode current collector, a primer layer, and a negative-electrode film layer;

the negative-electrode film layer comprises a first negative-electrode film layer and a second negative-electrode film layer, and the first negative-electrode film layer is located between the primer layer and the second negative-electrode film layer; and the first negative-electrode film layer comprises a first negative-electrode active material, wherein the first negative-electrode active material comprises first artificial graphite, at least some particles in the first artificial graphite are secondary particles, and a quantity proportion A of the number of the secondary particles to a total number of particles of the first negative-electrode active material satisfies A≥50%.

2. The secondary battery according to claim 1, wherein the primer layer comprises a conductive agent and a binder.

3. The secondary battery according to claim 1, wherein A≥60%.

4. The secondary battery according to claim 1, wherein a thickness of the primer layer is greater than or equal to 1 μm.

5. The secondary battery according to claim 2, wherein a mass proportion of the conductive agent in the primer layer is greater than or equal to 50%; or
a mass proportion of the binder in the primer layer is less than or equal to 50%.

6. The secondary battery according to claim 2, wherein the conductive agent comprises a conductive carbon material.

7. The secondary battery according to claim 2, wherein the binder comprises one or more of styrene butadiene rubber (SBR), polyvinylidene fluoride (PVDF), a copolymer of vinylidene fluoride, polystyrene, polyacrylic acid, polytetrafluoroethylene, polyacrylonitrile, polyimide, polyurethane, polyvinyl alcohol, polyvinyl butyral (PVB), polyacrylate, acrylic acid-acrylonitrile copolymer, ethylene-vinyl acetate copolymer (EVA), acrylate-acrylonitrile copolymer, and modified compounds thereof.

8. The secondary battery according to claim 1, wherein the first negative-electrode active material further comprises natural graphite.

9. The secondary battery according to claim 1, wherein the first negative-electrode active material further satisfies one or more of the following conditions:
a volume-based median particle size $D_v50$ of the first negative-electrode active material satisfies $D_v50 \geq 15$ μm;
particle size uniformity of the first negative-electrode active material is 0.20-0.60;
a specific surface area SSA of the first negative-electrode active material satisfies SSA≤1.6 m²/g;
a particle size distribution of the first negative-electrode active material is $0.6 \leq (D_v90-D_v10)/D_v50 \leq 3.5$;
a powder OI value of the first negative-electrode active material is less than or equal to 8.5; and
a gram capacity of the first negative-electrode active material is greater than or equal to 352 mAh/g.

10. The secondary battery according to claim 1, wherein a second negative-electrode active material comprises second artificial graphite.

11. The secondary battery according to claim 10, wherein at least some particles in the second artificial graphite are secondary particles, and a quantity proportion B of the number of the secondary particles to a total number of particles of the second negative-electrode active material satisfies B 60%.

12. The secondary battery according to claim 1, wherein the second negative-electrode active material further satisfies one or more of the following conditions:
a volume-based median particle size $D_v50$ of the second negative-electrode active material satisfies 7 μm≤$D_v50$≤15 μm;
particle size uniformity of the second negative-electrode active material is 0.20-0.50;
a specific surface area SSA of the second negative-electrode active material satisfies SSA≤1.6 m²/g;
a particle size distribution of the second negative-electrode active material is $0.5 \leq (D_v90-D_v10)/D_v50 \leq 3.0$;
a powder OI value of the second negative-electrode active material is less than or equal to 6; and
a gram capacity of the second negative-electrode active material is greater than or equal to 345 mAh/g.

13. The secondary battery according to claim 1, wherein the secondary battery further satisfies includes one or more of the following conditions:
a ratio of the particle size uniformity of the second negative-electrode active material to the particle size uniformity of the first negative-electrode active material is 0.6-2;
the volume-based median particle size $D_v50$ of the second negative-electrode active material is less than the volume-based median particle size $D_v50$ of the first negative-electrode active material;
a surface density of the negative-electrode film layer is greater than or equal to 0.117 m g/mm², and optionally, 0.119-0.130 mg/mm²;
a press density of the negative-electrode film layer is 1.4-1.75 g/cm³, and optionally, 1.65-1.75 g/cm³;
a thickness ratio of the second negative-electrode film layer to the first negative-electrode film layer is 1:1-3:2; and
a ratio of the OI value of the second negative-electrode active material to the first negative-electrode active material is less than or equal to 1.2.

14. A method for preparing the secondary battery according to claim 1, comprising at least the following steps of:
providing a primer layer on at least one side of a negative-electrode current collector;
providing a first negative-electrode film layer on the primer layer; and
providing a second negative-electrode film layer on the first negative-electrode film layer; wherein
the secondary battery comprises a negative-electrode plate, the negative-electrode plate is of a multi-layer structure, and the multi-layer structure sequentially comprises: a negative-electrode current collector, a primer layer, and a negative-electrode film layer; the negative-electrode film layer comprises the first negative-electrode film layer and the second negative-electrode film layer, and the first negative-electrode film layer is located between the primer layer and the second negative-electrode film layer; and
the first negative-electrode film layer comprises a first negative-electrode active material, wherein the first negative-electrode active material comprises first artificial graphite, at least some particles in the first artificial graphite are secondary particles, and a quantity proportion A of the number of the secondary particles to a total number of particles of the first negative-electrode active material satisfies A≥50%.

15. An apparatus comprising at least one of a secondary battery according to claim 1.

16. An apparatus comprising a secondary battery prepared by the method according to claim 14.

* * * * *